(12) United States Patent
Miyashita

(10) Patent No.: US 7,983,326 B2
(45) Date of Patent: Jul. 19, 2011

(54) DIGITAL TRANSMISSION SYSTEM AND ITS TRANSMISSION STATUS RECOGNITION METHOD

(75) Inventor: Atsushi Miyashita, Tokorozawa (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 2126 days.

(21) Appl. No.: 10/889,010

(22) Filed: Jul. 13, 2004

(65) Prior Publication Data

US 2005/0024531 A1 Feb. 3, 2005

(30) Foreign Application Priority Data

Jul. 16, 2003 (JP) .................................. 2003-198033

(51) Int. Cl.
*H04L 5/16* (2006.01)
(52) U.S. Cl. ..................... 375/219; 375/295; 375/316
(58) Field of Classification Search ............... 348/425.1; 375/219

See application file for complete search history.

(56) References Cited

U.S. PATENT DOCUMENTS

| 6,307,565 | B1 * | 10/2001 | Quirk et al. | 345/554 |
| 7,283,553 | B2 * | 10/2007 | Kishigami et al. | 370/445 |
| 2003/0214507 | A1 * | 11/2003 | Mawatari et al. | 345/530 |
| 2006/0036819 | A1 * | 2/2006 | Suzuki et al. | 711/157 |

FOREIGN PATENT DOCUMENTS

| JP | 6-326735 | 11/1994 |
| JP | 2002-223459 | 8/2002 |

* cited by examiner

*Primary Examiner* — Shuwang Liu
*Assistant Examiner* — Dhaval Patel
(74) *Attorney, Agent, or Firm* — Brundidge & Stanger, P.C.

(57) ABSTRACT

A digital transmission system of a type in which a digitally-modulated transmission signal is mapped to two-dimensional data and transmitted from at least one relay point, and at a reception side, the two-dimensional data is identified and reproduced into the transmission signal. The system includes first and second memories provided in the relay point for alternately writing and reading transmission signal display information to display a transmission status of the transmission signal, and also includes a display data transmitter for alternately reading and transmitting the transmission signal display information. In the reception side, a display data reception circuit has third and fourth memories for receiving the transmission signal display information and performing write, read and output operations. The circuit alternately reads and outputs the transmission signal display information.

8 Claims, 15 Drawing Sheets

DIGITAL TRANSMISSION SYSTEM AND ITS TRANSMISSION STATUS RECOGNITION METHOD

INCORPORATION BY REFERENCE

The present application claims priority from Japanese application JP2003-198033 filed on Jul. 16, 2003, the content of which is hereby incorporated by reference into this application.

BACKGROUND OF THE INVENTION

The present invention relates to visualization of a transmission status in a digital transmission system and more particular, to a technique for retransmitting display data in relay transmission.

For radio transmission of video and voice signals, an analog transmission system has been used until several years back. In these years, however, a digital transmission system based on QAM (Quadrature Amplitude Modulation), OFDM (Orthogonal Frequency Division Multiplexing) or the like is used.

In the latter case, data to be transmitted is data about a transmission signal such as a TS (transport stream) obtained by compressing a video or voice signal in MPEG processing. In this case, however, there is generally used a digital transmission system of a type wherein a digitally-modulated transmission signal is mapped to two-dimensional data and transmitted from a transmission side, and a reception side identifies the two-dimensional data and reproduces it into the original transmission signal.

In the case of the aforementioned analog system, the SN (or S/N) ratio of the video or voice signal varies with the level of a received electric field. For this reason, in mobile transmission of, e.g., a marathon relay broadcast, a relayed video tends to be affected by much noise or disturbance, thus resulting in a low quality of image.

When the digital transmission system is employed, however, digitalized information is transmitted and thus error correction can be applied thereto. As a result, even in such a transmission environment in which the level of a received electric field varies, an identical quality of images can be relayed so long as the field level is within an error correctable range.

In the digital transmission system, on the other hand, if the field level is lower than a predetermined limit value, then the error correcting function cannot work. In this case, transmission of the video signal becomes abruptly impossible, but a lower limit value at the then field level can be known to a certain extent according to the signal status of a reception side in the identifying/deciding operation.

For example, in the case of a 64 QAM system having a transmission rate of 60 Mbps which is often used, a carrier-to-noise (C/N) ratio has a minimum of about 27 dB and thus the lower limit value of the received field level is about −70 dBm. Accordingly, the field level is required to be higher than the lower limit value for video transmission.

In the case of a 16QAM2 system having a transmission rate as relatively small as 35 Mbps, the C/N ratio has a minimum of about 18 dB and thus the lower limit value of the received field level is about −80 dBm, resulting in that the video can be transmitted so long as the field level is higher than the lower limit value.

As a digital transmission system to which such a data correcting function is applied, there is already known a system in which the lower limit value of level of a received electric field is recognized based on a transmission status or a synchronous reproduction status, as disclosed in JP-A-6-326735 or JP-A-2002-223459.

An example of such a digital transmission system will next be explained by referring to FIG. 15. The drawing is an exemplary prior art when a digital transmission system having a data correcting function applied thereto is used to relay a video from a site or point A to a site or point B. In this case, for example, the point A corresponds to an photographing site where a relay car is capturing an image or images of a running marathon athlete or athletes, the point B corresponds to a broadcast station, and broadcast transmission between the points A and B is carried out wirelessly using radio waves, e.g., in a microwave band.

At the point A, a video signal taken by a television camera (not shown) is input to an MPEG encoder 1, where the input signal is converted to compressed data TS, and then the data TS is input to a mapper 2 for determining a modulation mode, where the input compressed data TS is converted to two-dimensional data Dm.

The data Dm is modulated by a modulator (MOD) 3 to an intermediate frequency signal Dmod in a 130 MHz band, and the signal is supplied to a high frequency (microwave) transmitter 4. In the transmitter, the intermediate frequency signal Dmd is converted to a signal having frequencies in the microwave band, power-amplified, sent to an antenna 5, and then transmitted from the antenna 5 as a microwave W1 to an antenna 6 located at the point B.

The microwave W1 transmitted to the antenna 6 at the point B is received at the point B as a microwave signal and then input to a high frequency receiver 7. In the receiver 7, the received weak signal is amplified and converted from the signal in the microwave band to and an intermediate frequency signal Ddem in the 130 MHz band.

The intermediate frequency signal Ddem is then input to a demodulator (DEM) 8, where the intermediate frequency signal is subjected to timing and frequency reproducing operations, that is, is demodulated to two-dimensional data Dd having an in-phase component I and a quadrature component Q. The two-dimensional data Dd is restored by an identification decider 9 to reproduced compressed data TSr, and then input to an MPEG decoder 10, where the data TSr is expanded to a video signal.

At this time, since the level of the received electric field has a lower limit as mentioned above, it is required to recognize the good or bad status (quality) of the transmission or synchronous reproduction. To this end, the system is arranged so that the two-dimensional data Dd output from the DEM 8 is supplied also to a display unit 11 as an X-Y input of an oscilloscope provided in the display unit, whereby a constellation can be observed on the display though short in its displayable time.

In this case, the constellation displayed on the oscilloscope of the display unit 11 is as shown in FIGS. 16A and 16B. FIG. 16A is a display when the transmission or synchronous reproduction status, in which case mapped points are combined into a small group. However, when the status becomes bad, the mapped points becomes large and blurred as shown in FIG. 16B.

Thus, by observing the constellation displayed on the oscilloscope, the user can recognize the transmission or synchronous reproduction status and can determine whether or not the level of electric field reaches its transmittable range.

For this reason, the user can anticipate a danger of interruption in the video transmission and can previously take measures against it, for example, can change over to another program previously prepared.

In the aforementioned prior art, however, no consideration is paid to a situation where at least one relay point is provided in the transmission line of relay data leading from the point A via the point B further to the point C. Thus when the broadcast station wants to monitor the transmission status or statues of specific one or ones of such relay points, the prior art has a problem that the station cannot recognize the reception status of a relay point on the way.

For example, when the point A is located away from the broadcast station or when such an object as to cause a trouble in radio wave propagation exists on the way, it is required to provide a relay point on the way to the broadcast station. In this case, as shown in FIG. 17, the relay point corresponds to the point B which is located, e.g., on a low hill, and the point C corresponds to the broadcast station.

In this case, FIG. 17 corresponds to the system arrangement of FIG. 15, but is different from FIG. 15 in that a retransmitter 12 and a transmitting antenna 13 are newly added as a relay point, and a receiving antenna 14 and a receiver 15 are newly added to a reception side such as a broadcast station.

And the retransmitter 12 and the transmitting antenna 13 are provided in the point B, the receiving antenna 14 and the receiver 15 are provided in the point C, and transmission between the points B and C uses, e.g., a wave W2 in the microwave band. Thus, the transmission system of FIG. 17 is a 2-stage relay transmission type.

In this case, the retransmitter 12 in the relay point receives the reproduced compressed data TSr issued from the identification decider 9, and transmits the data carried on the microwave W2 from the antenna 13 to be received by the antenna 14 located at the point C.

The antenna 14 receives the microwave W2 and sends it to the receiver 15, where the microwave W2 is to be reproduced into a video signal. In this case, the broadcast station as the point C cannot monitor the reception status of the point B.

SUMMARY OF THE INVENTION

The present invention is made in view of the above respects, and it is an object of the invention to provide a digital transmission system in which, even in the case of two-stage relay transmission, a final point can monitor the reception status of a relay point on the way to the final point.

The above object is attained by a digital transmission system of a type wherein a digitally-modulated transmission signal is mapped to two-dimensional data and then transmitted from a transmission side, the two-dimensional data is identified to reproduce it into the transmission signal in a reception side. In the system, a display data transmitter (1) and a display data receiver (2) (to be explained below) are provided so that the system can monitor the propagation status of the transmission side on the basis of constellation information issued from the display data receiver.
(1) The display data transmitter is provided in the transmission side and includes first and second memories which alternately write and read the constellation information. The display data transmitter reads the constellation information alternately from the first and second memories and outputs it onto a communication line.
(2) The display data receiver is provided in the reception side and includes third and fourth memories into which the constellation information received from the communication line is alternately written. The display data receiver reads out the constellation information alternately from the third and fourth memories, and outputs it.

In this connection, the above object is also attained when the constellation information is divided in units of address row in the memories and is read out from the memories in units of address row, or when the constellation information is divided into four areas of each memory, i.e., upper left, upper right, lower left, and lower right and is read out from the four areas.

In the present embodiment of the invention, more specifically, the display data transmitter for outputting a memory contents having 1 written at an address corresponding to an I&Q signal value is firstly located in the point B, and the display data transmitter is connected via a telephone line or the like with the display data receiver located in the point C.

Secondly, each memory is divided in units of a row, a history memory for storing the presence or absence of write is provided in units of a memory row, so that transmission is omitted for the row unit with the absence of write on the basis of contents of the history memory to reduce the number of transmission times. As a result, a transmission rate can be increased.

Thirdly, each memory is divided into four areas to each of which a writing and transmitting function is applied.

In this case, though each memory is divided into the four areas, the speed of updating can be increased so that the user can quickly recognize the transmission status from the point A to the point B.

As mentioned above, the provision of the above display data transmitter and display data receiver enables the display data transmitter to read out the constellation information alternately from the first and second memories and to output it onto the communication line, and also enables the display data receiver to write the constellation information received via the communication line to the third and fourth memories. As a result, the user can recognize the transmission status.

Other objects, features and advantages of the invention will become apparent from the following description of the embodiments of the invention taken in conjunction with the accompanying drawings.

DESCRIPTION OF THE EMBODIMENTS

Figure 1:
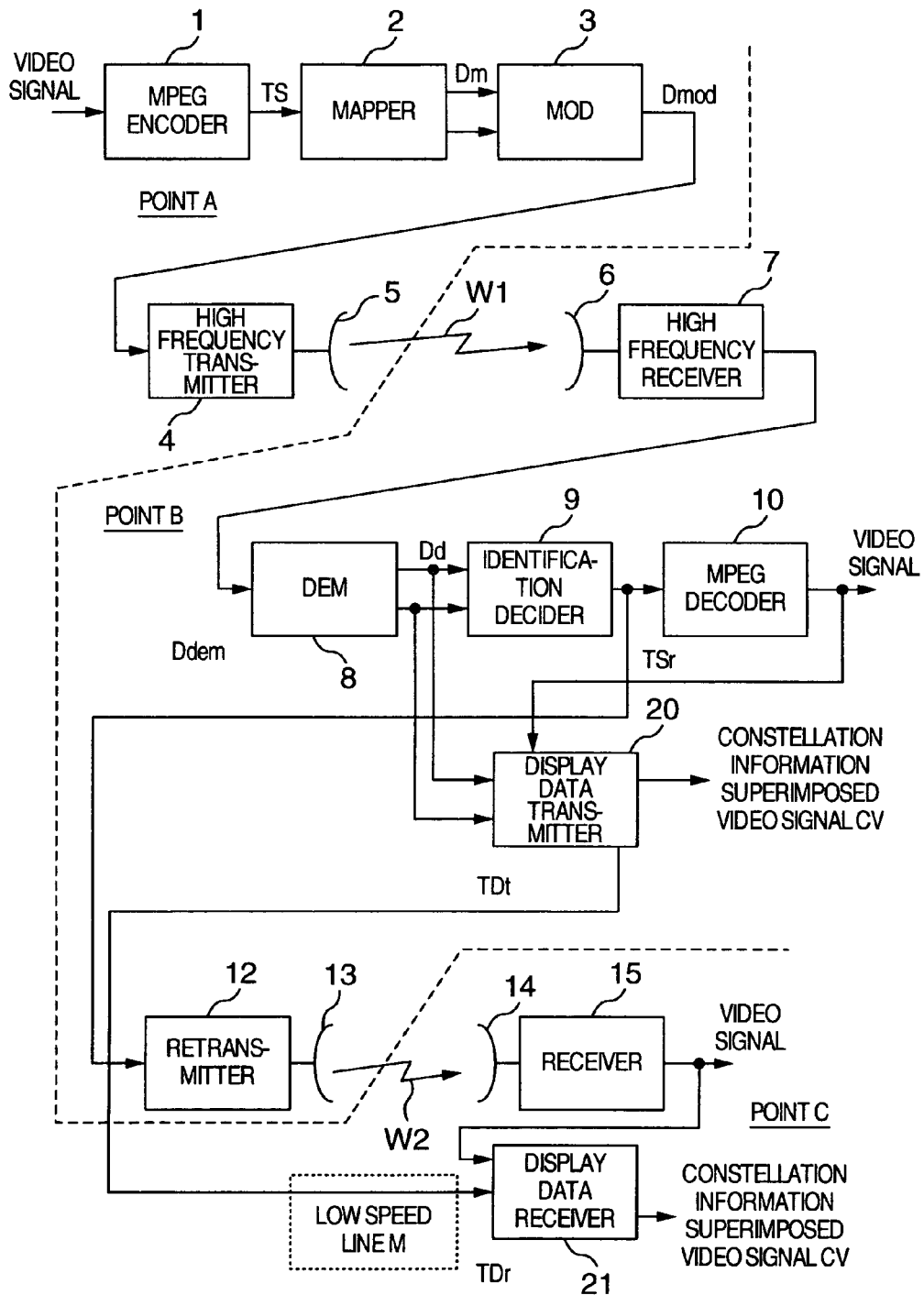
FIG. 1 is a block diagram showing a system configuration of a digital transmission system in accordance with an embodiment of the present invention.

A digital transmission system in accordance with the present invention will be detailed in connection with illustrated embodiments. FIG. 1 shows a first embodiment of the present invention, in which reference numeral 20 denotes a display data transmitter, numeral 21 denotes a display data receiver, and other arrangement is substantially the same as in the prior art digital transmission system explained in FIG. 17.

Figure 17:
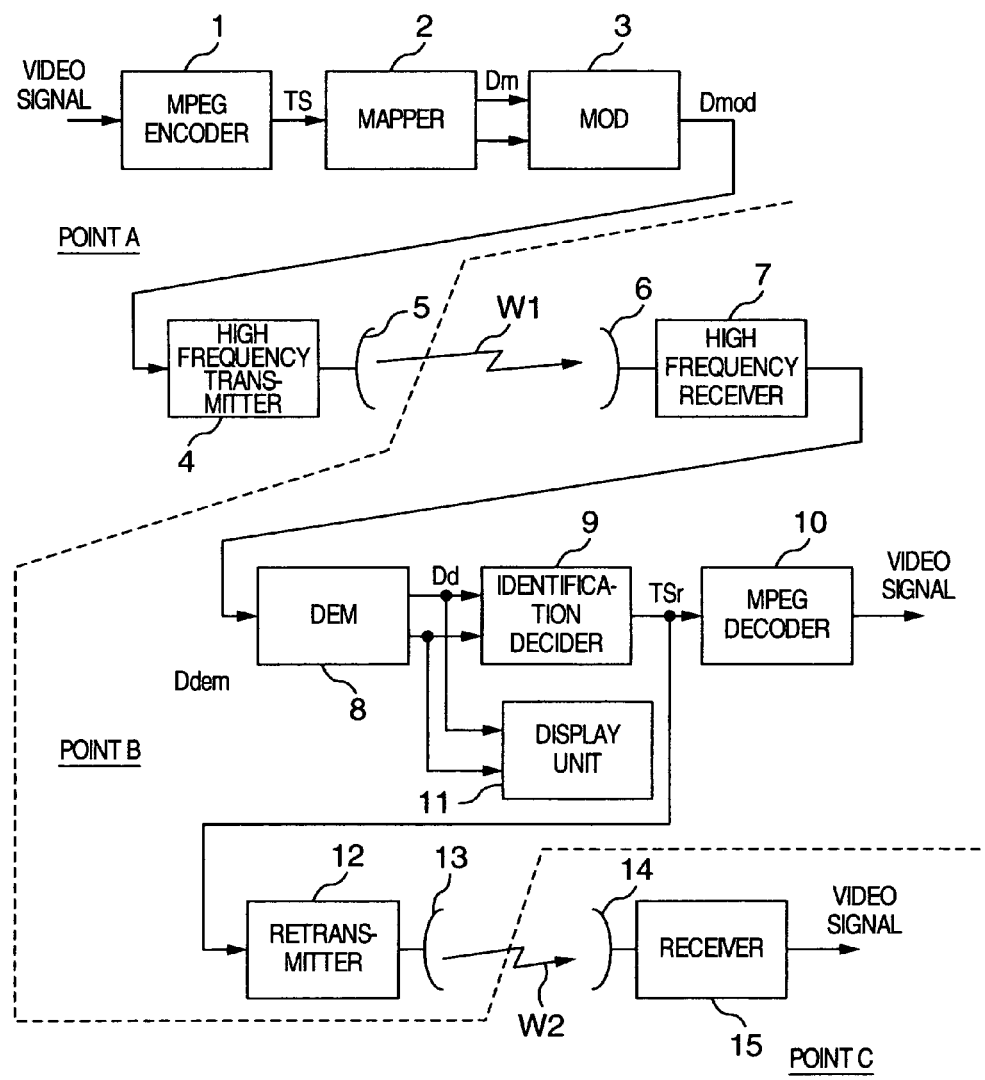
FIG. 17 is a system configuration of another example of the prior art digital relay systems having a propagation status display function.

Thus the embodiment of FIG. 1 corresponds, in block arrangement, to the prior art of FIG. 17, but is different therefrom in that the display unit 11 in a relay site of the site point B is replaced by the display data transmitter 20 and the display data receiver 21 is newly added in the site point C.

In the embodiment, further, interconnection between the display data transmitter 20 and the display data receiver 21 is carried out by means of a low speed line M such as a telephone line, so that, even at the site point C, the reception status of the site point B as a relay point on the way can be monitored.

Explanation will first be made as to the display data transmitter 20 and detailed explanation thereof will be made later. Two-dimensional data Dd is applied from a demodulator (DEM) 8 to the display data transmitter 20. The display data transmitter converts the received two-dimensional data Dd to transmission data TDt conformed to transmission by the low speed line M, and transmits the converted data onto the low speed line M.

At this time, the display data transmitter 20 is arranged to output a signal (i.e. constellation-information superimposed video signal CV) obtained by superimposing the transmission data TDt on a video signal. And when the constellation-information superimposed video signal CV is supplied to a not shown display unit (corresponding to the display unit 11 in FIG. 17), the reception status at the site point B can be monitored.

The display data receiver 21 will be explained but detailed explanation thereof will be made later. The transmission data TDt received via the low speed line M is applied as received data TDr to the display data receiver 21. The display data receiver in turn restores the received data to the original two-dimensional data Dd and outputs the constellation-information superimposed video signal CV.

Similarly to the display unit 11 (refer to FIG. 17) in the site point B, an oscilloscope (not shown) is provided and the restored data Dd is supplied to an X-Y input of the oscilloscope to display a constellation thereon. As a result, even at the site point C, the reception status at the site point B as a relay point on the way can be monitored.

Figure 2:
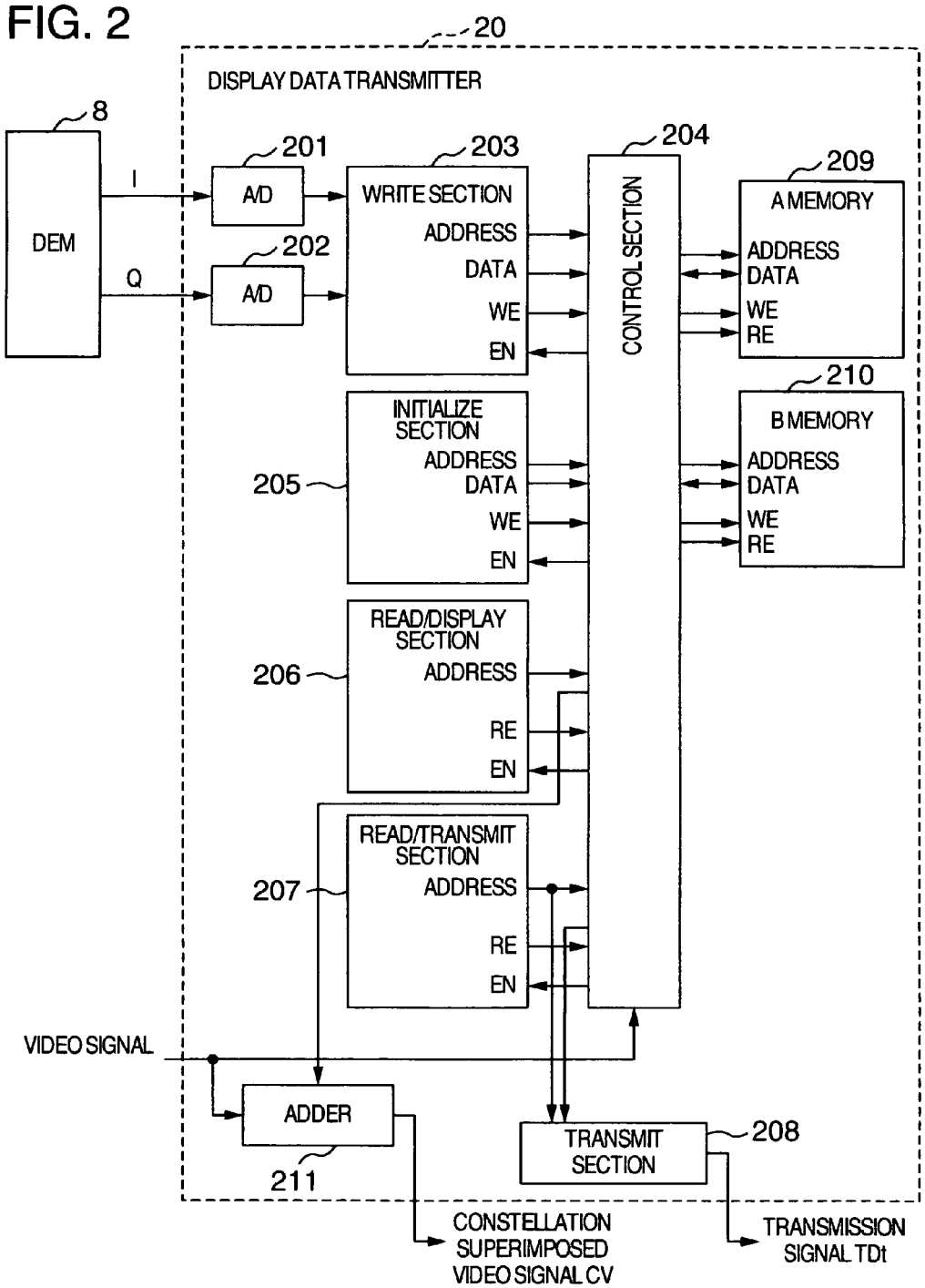
FIG. 2 is a block diagram of a first embodiment of a display data transmitter in the digital transmission system of the present invention.

Explanation will next be made as to the details of the display data transmitter 20 and display data receiver 21. FIG. 2 shows an embodiment of the display data transmitter 20. As illustrated, applied to the display data transmitter 20 are an in-phase component signal I and a quadrature component signal Q which are contained in the two-dimensional data Dd demodulated by the DEM 8. At this time, the video signal is also applied to the display data transmitter 20.

More specifically, the signals I and Q are input to A/D converters 201 and 202 respectively, converted to digital signals therein, and then input to a write section 203.

Figure 3:
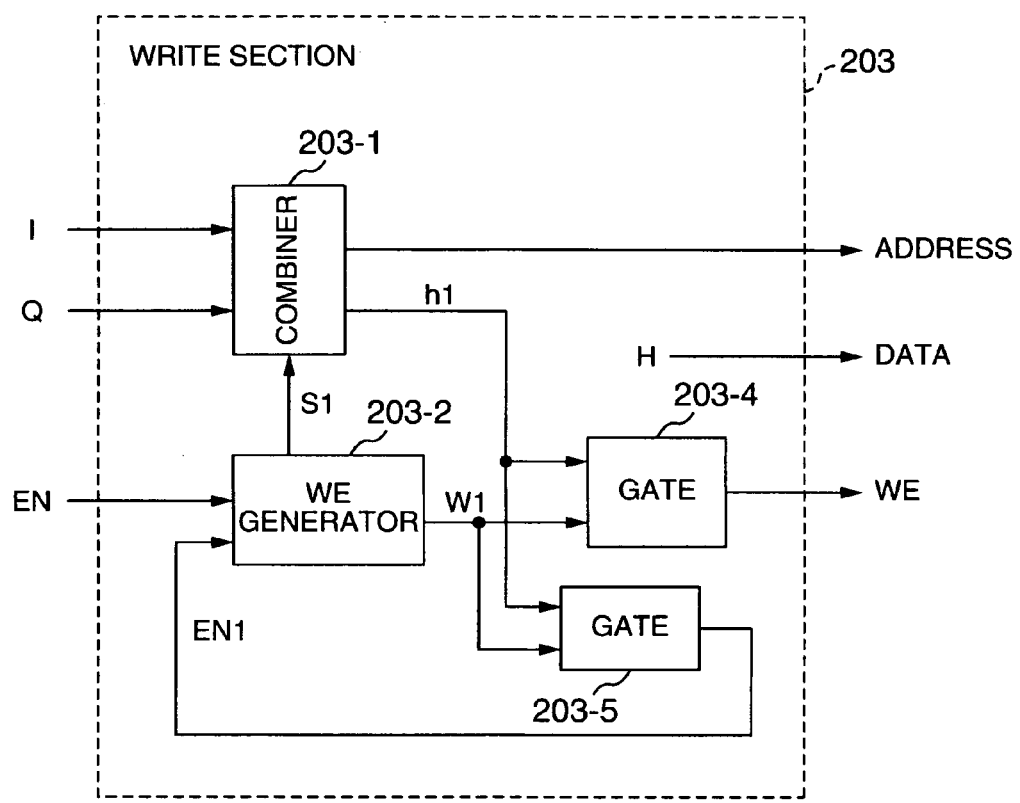
FIG. 3 is a block diagram showing details of a write section in the first embodiment of the display data transmitter in the present invention.

FIG. 3 shows details of the write section 203. The signals I and Q input to the write section are first translated by a combiner 203-1 into a two-dimensional address in a display space. The then translated result is held by a pulse S1 supplied from a WE generator 203-2 to form an address output.

The combiner 203-1 also performs a logical OR operation between a change point in the signal I and a change point in the signal Q, generates a pulse h1 indicative of change point timing between the signals I and Q, and supplies the pulse to gates 203-4 and 203-5.

At this time, the WE generator 203-2 generates the aforementioned pulse S1 in response to an enable (EN) output received from a control section 204, also generates a pulse W1 as the WE (write enable) source, and supplies the pulse W1 to the gates 203-4 and 203-5.

The gate 203-4 turns the pulse hi on and off according to the pulse W1. When the pulse W1 fails to appear, the gate outputs the pulse W1 as a WE signal without being changed. When the appearance timing of the pulse h1 coincides with that of the pulse W1, the gate turns the pulse W1 off to avoid the pulse W1 from being output as the WE signal.

Similarly, when the appearance timing of the pulse h1 coincides with that of the pulse W1, the gate 203-5 supplies a pulse EN1 to the WE generator 203-2 to turn off the input of the EN signal supplied to the WE generator 203-2 from the control section 204 and to change the generation timing of the WE signal.

The write section 203 further outputs data having an all-time level H to the control section 204 in such a manner that the data of the level H is eventually written in the memory space according to the values of the signals I and Q.

And the address output, the data output, and the controlling WE output are supplied from the write section 203 to the control section 204.

The display data transmitter 20 has an initialize section 205, a read/display section 206 and a read/transmit section 207. Firstly, the initialize section 205 inputs an address output, a data output and WE output to the control section 204. At this time, the video signal is input to the control section 204 without being processed.

Figure 4:
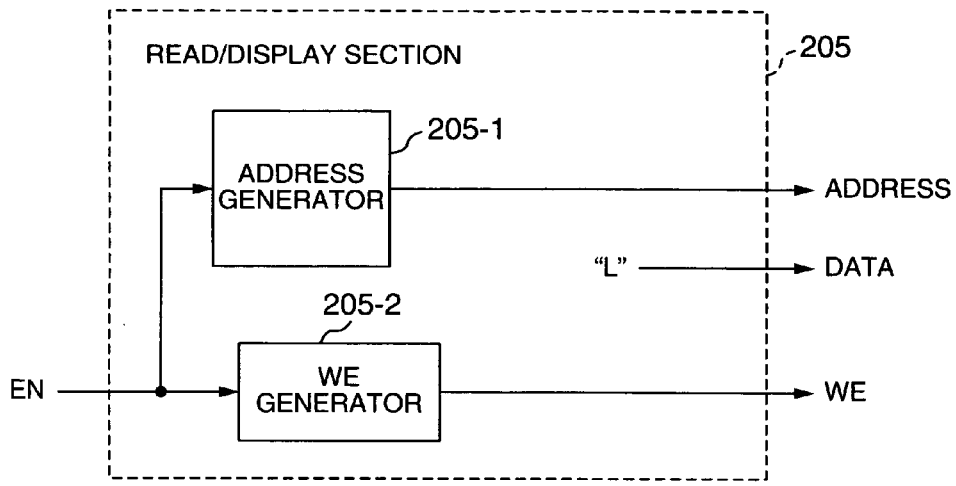
FIG. 4 is a block diagram showing details of an initialize section in the first embodiment of the display data transmitter in the invention.

The details of the initialize section 205 is shown in FIG. 4, in which an address generator 205-1 and a WE generator 205-2 are controllably operated and stopped according to an input of the EN signal. The address generator 205-1 outputs an address, and the WE generator 205-2 outputs a WE signal. The initialize section 205 also outputs a data signal having a level L.

In the general operation of the initialize section, the initialize section writes the data of the level L in the memory address space under control of the address generator 205-1 according to the EN input, which results in that the constellation display space is initialized with black.

Meanwhile, each of the read/display section 206 and read/transmit section 207 supplies an address output and an RE (read enable) output to the control section 204. At this time, the address output of the read/transmit section 207 is also supplied to a transmit section 208, and read data is supplied also to the transmit section 208 from the control section 204. And an output of the transmit section 208 is output as a transmission signal TDt.

Figure 5:
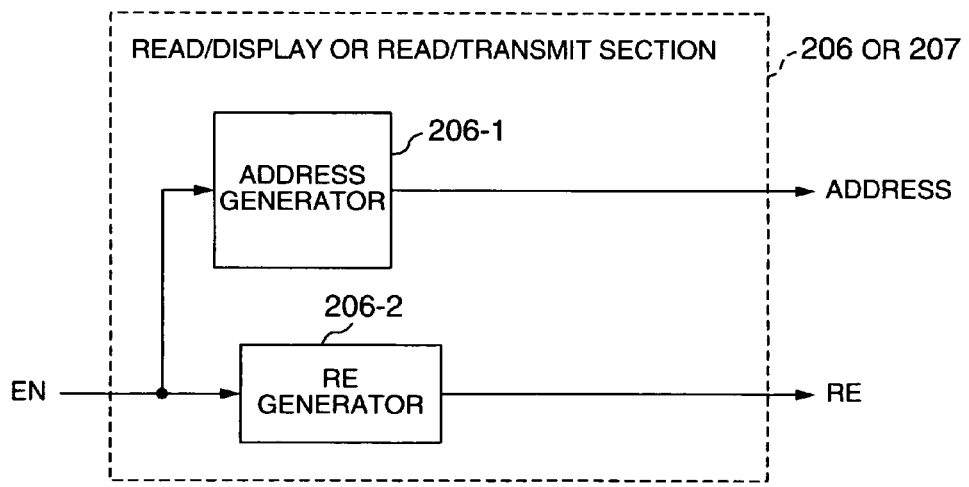
FIG. 5 is a block diagram showing details of a read control section or a read/transmit section in the first embodiment of the display data transmitter in the invention.

FIG. 5 shows details of the read/display section 206 or read/transmit section 207. An address generator 206-1 and an RE generator 206-2 are controllably operated and stopped according to an input of the EN signal. The address generator 206-1 outputs an address according to the screen display, and the RE generator 206-2 outputs an RE signal.

In the general operation of the read/display section or read/transmit section, the read/display section or read/transmit section reads out data in the memory address space under control of the address generator 206-1 according to the input of the EN signal. That is, accumulated constellations are output into the display space at the timing of display scanning line.

And the control section 204 first outputs a signal EN enabling the operations of the write section 203, initialize section 205, read/display section 206 and read/transmit section 207.

At this time, the control section 204 switches between an A memory 209 and a B memory 210, and outputs the address and data outputs, and WE and RE control signals, which are received from the write section 203, initialize section 205, read/display section 206, and read/transmit section 207, to the selected memory. Data read out from the A and B memories 209 and 210 is output to the adder 211.

An adder 211 adds data read out from the A and B memories 209 and 210 to the video signal to generate the constellation-information superimposed video signal CV, and outputs the signal CV.

Figure 6:
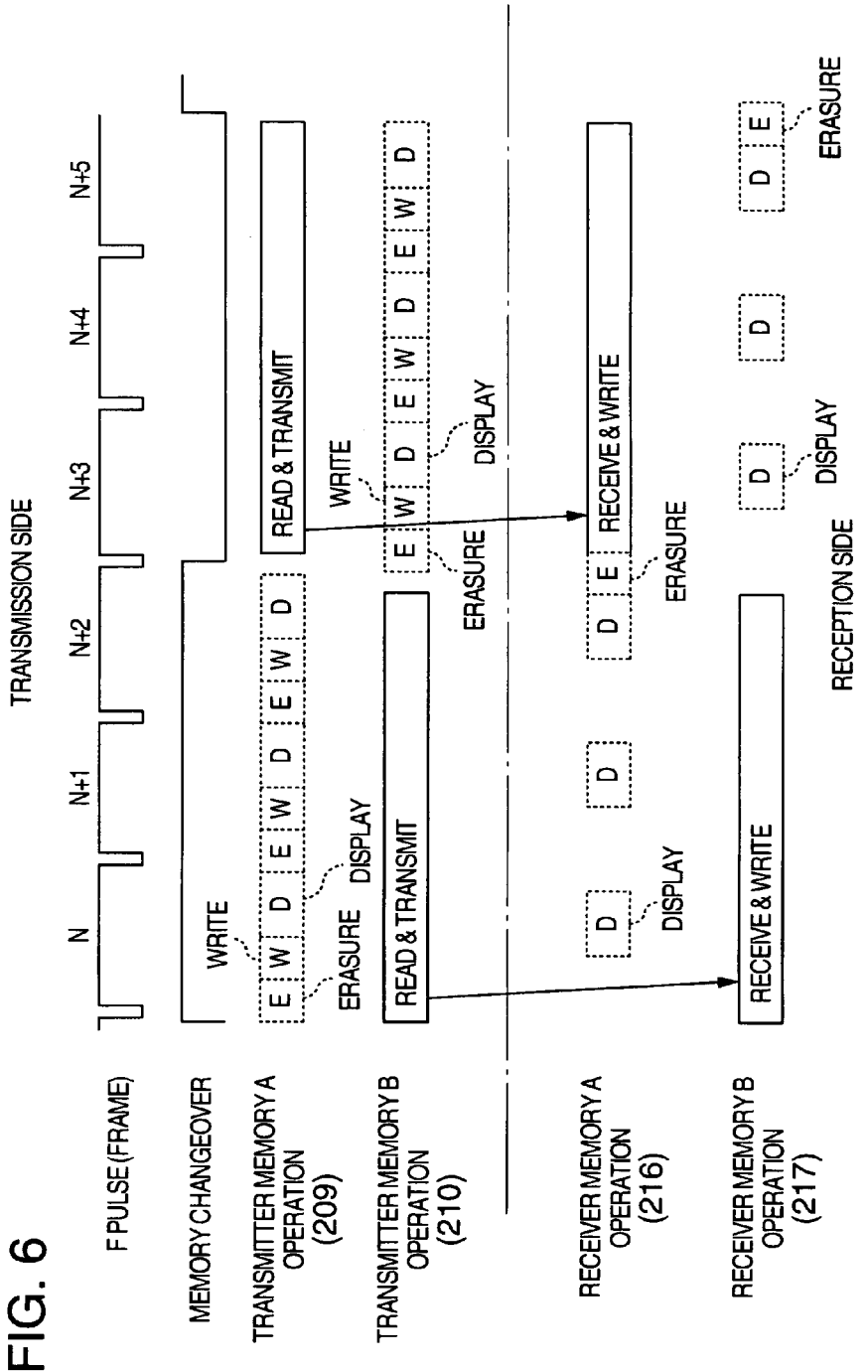
FIG. 6 is a timing chart showing write, erase and read operations at transmission and reception sides in the embodiment of the present invention.

Explanation will then be made as to the operation of the control section 204 by referring to FIG. 6. As illustrated, the values of the in-phase component I and quadrature component Q input from the DEM 8 are first converted into corresponding memory address spaces for respective frames (N, N+1, . . . ) of divisions of an F (frame) pulse, switched between the A and B memories 209 and 210, and then written in the memories as data having the level H.

At this time, in a read duration, data having the level H are read out from the A and B memories 209 and 210 at corresponding memory addresses, and data at the other memory addresses in which constellation data is not written remain at the level L.

Erasure (initialization) to be carried out after completion of the reading operation can be given by writing data of the level L in an address space corresponding to the read. As a result, the accumulated contents of mapped points cam be initialized.

Figure 7:
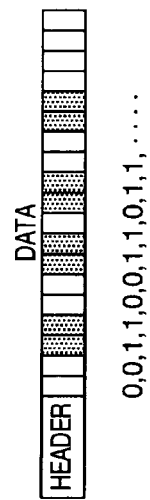
FIG. 7 is a diagram for explaining the structure of transmission data in the embodiment of the present invention.

In the illustrated example, the read/transmit section 207 acts to enable reading operation at a speed according to the transmission rate of the low speed line M. At this time, the transmit section 208, as shown in FIG. 7, attaches a header to the data read according to the read address of the read/transmit section 207, and transmits it onto the low speed line M as the transmission signal TDt.

The above operation will be explained further in detail with reference to FIG. 6. The control section 204 first generates the F pulse as data indicative of timing of the frame period from the input video signal.

According to the F pulse, display (read), erase (initialize) and write (constellation write corresponding to memory addresses) operations are performed over a two-plane memory, that is, the A and B memories. More specifically, as shown in FIG. 6, when display, erase and write operations are performed over the A memory, read and transmit operations are performed over the B memory.

Accordingly, the operation of the A memory 209 of the display data transmitter 20 as the transmission side is as follows.

Head part of frame N→Erase entire A memory
Middle part of frame N→Write entire A memory
Tail part of frame N→Read (Display) entire A memory
Head part of frame (N+1)→Erase entire A memory
Middle part of frame (N+1)→Write entire A memory
Tail part of frame (N+1)→Read (Display) entire A memory
Head part of frame (N+2)→Erase entire A memory
Middle part of frame (N+2)→Write entire A memory
Tail part of frame (N+2)→Read (Display) entire A memory
Frames (N+3) to (N+5)→Read & transmit entire A memory,
and so on.

The operation of the other B memory 210 is as follows.
Frames N to (N+2)→Read & transmit entire B memory
Head part of frame (N+3)→Erase entire B memory
Middle part of frame (N+3)→Write entire B memory
Tail part of frame (N+3)→Read (display) entire B memory
Head part of frame (N+4)→Erase entire B memory
Middle part of frame (N+4)→Write entire B memory
Tail part of frame (N+4)→Read (display) entire B memory
Head part of frame (N+5)→Erase entire B memory
Middle part of frame (N+5)→Write entire B memory
Tail part of frame (N+5)→Read (display) entire B memory,
and so on.

Explanation will next be made as to the display data receiver 21 with reference to FIG. 8.

Figure 8:
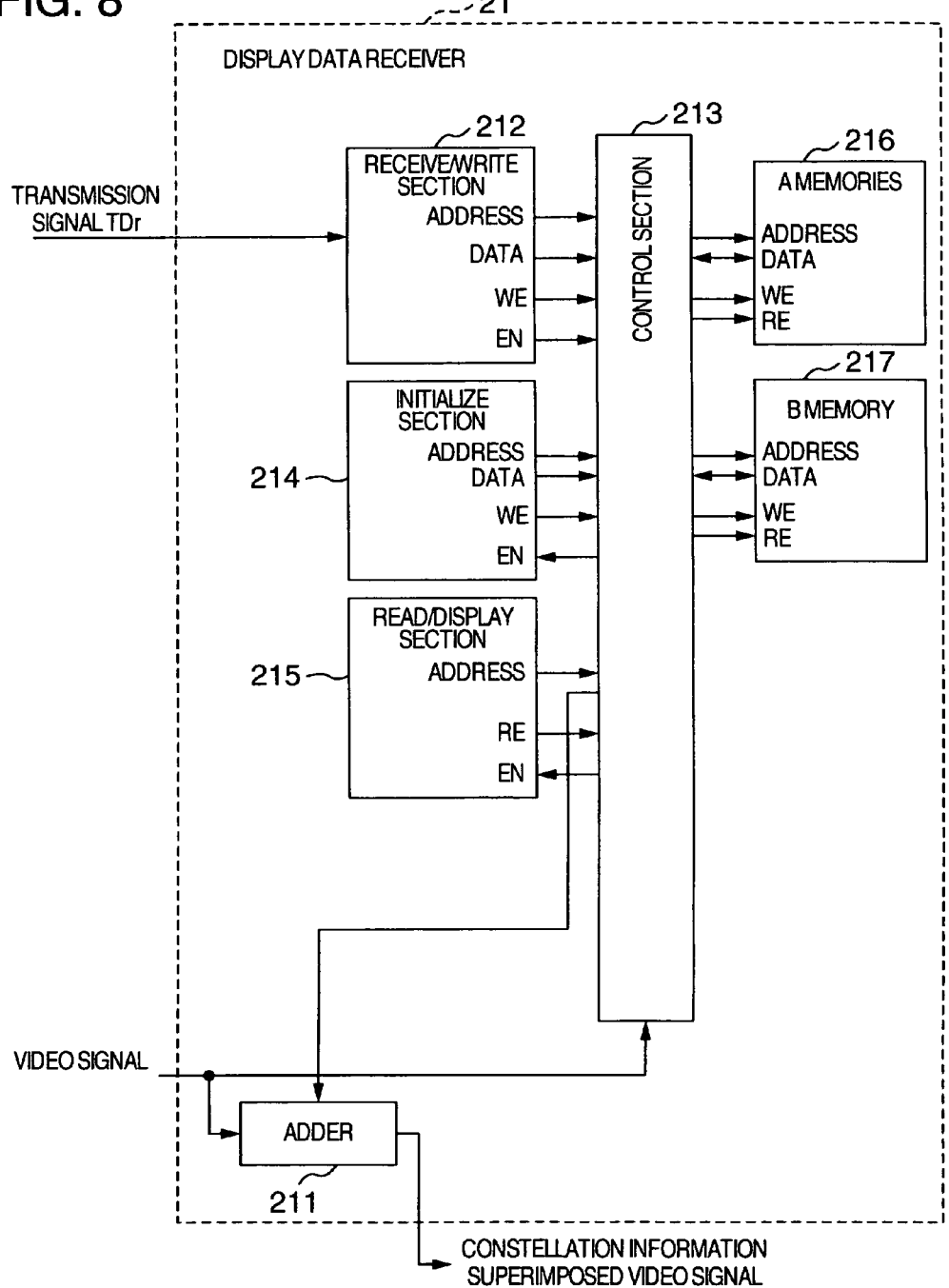
FIG. 8 is a block diagram of a structure of a display data receiver in the embodiment of a display data receiver in the digital transmission system in accordance with the embodiment of the present invention.

In FIG. 8, the transmission signal TDr is supplied to the display data receiver 21 via the low speed line Ms. More specifically, the transmission signal TDr is input to a receive/write section 212, as illustrated.

Figure 9:
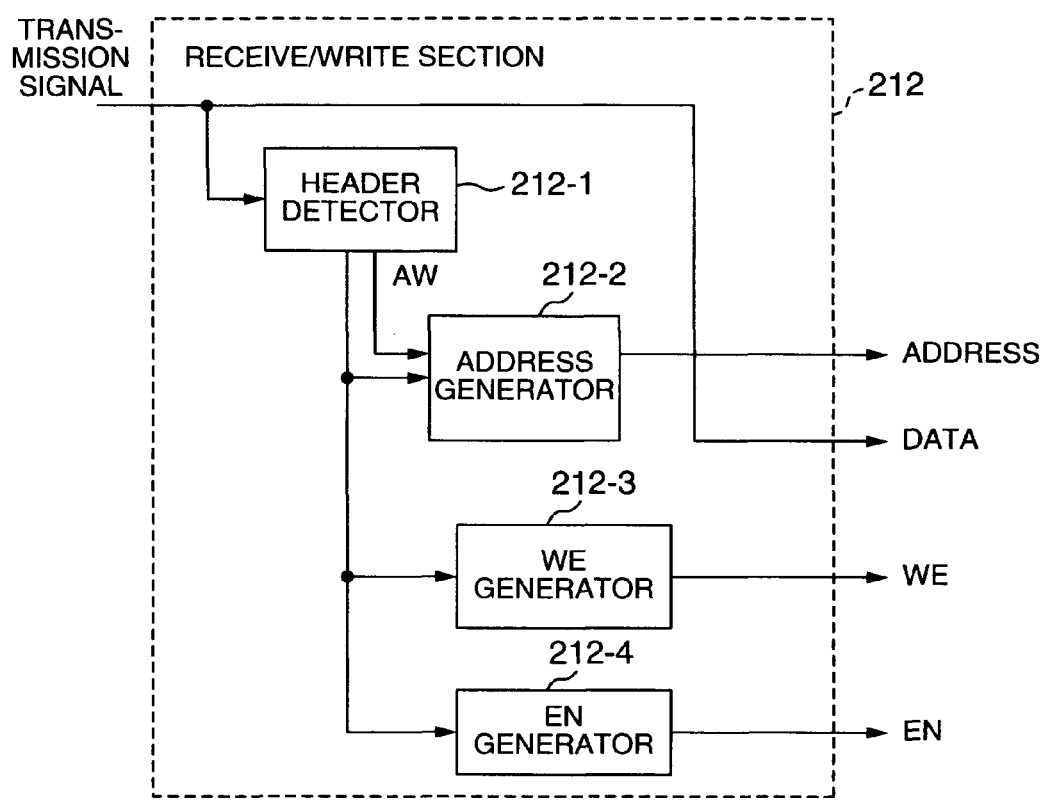
FIG. 9 is a block diagram showing details of a receive/write section in the display data receiver in the embodiment of the invention.

FIG. 9 shows details of the receive/write section 212, in which the transmission signal TDr is supplied to a header detector 212-1, where such a header as explained in FIG. 7 is added. An address AW for memory division to be transmitted is detected on the basis of its contents, and the detected address AW is supplied to an address generator 212-2.

At this time, the header detector 212-1, when capturing the head, detects the start and end of the transmission of the transmission signal TDr, and informs the address generator 212-2, a WE generator 212-3, and an EN generator 212-4 of the detected start and end of the transmission.

The address generator 212-2 generates an address value corresponding to data to be received through transmission according to the address AW. Each of the WE generator 212-3 and EN generator 212-4 generates a WE output and an EN output, and informs a control section 213 of the timing of the transmission/receive, display and initialize.

Turning back to FIG. 8, an initialize section 214 is the same as the initialize section 205 explained in FIG. 4, a read/display section 215 is the same as the read/display section 206 explained in FIG. 5, and an A memory 216 and a B memory 217 are the same as the A memory 209 and the B memory 210 in FIG. 2.

Accordingly, the operation of the A memory 216 of the display data receiver 21 is as follows, as shown in FIG. 6.

Middle part of frame N→Read (display) entire A memory

Middle part of frame (N+1)→Read (display) entire A memory

Middle part of frame (N+2)→Read (display) entire A memory

Tail part of frame (N+2)→Initialize entire A memory

Frames (N+3) to (N+5)→Receive & write entire A memory,

And so on.

Similarly, the operation of the B memory 217 of the display data receiver 21 is as follows.

Frames N to (N+2)→Receive & write entire B memory

Middle part of frame (N+3)→Read (display) entire B memory

Middle part of frame (N+4)→Read (display) entire B memory

Middle part of frame (N+5)→Read (display) entire B memory

Tail part of frame (N+5)→Initialize entire B memory, and so on.

Thus, when the above operations are combined, the two-dimensional data Dd supplied from the DEM 8 is placed into the memories (A and B memories) in the display data transmitter 20 located at the site point B.

At this time, as shown in FIGS. 10A, 10B, 11A, and 11B, the value of a middle point between the I and Q signals is set at a middle point between memory addresses, the horizontal address direction of the memory is associated with the I signal, and the vertical address direction thereof is associated with the Q signal.

Figure 10A:
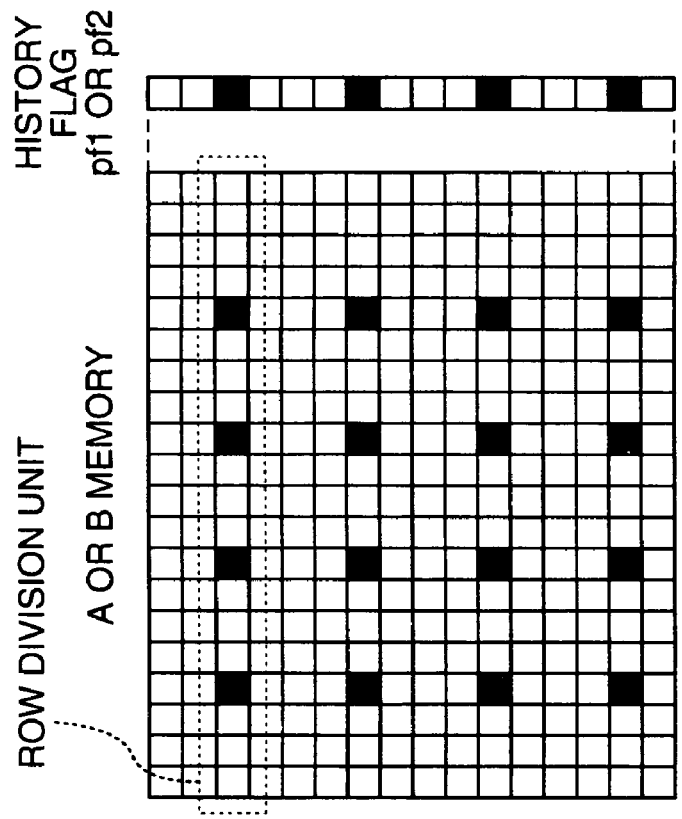
FIGS. 10A and 10B are diagrams for explaining a relationship between an example of constellation display and a memory in the embodiment of the invention.
Figure 10B:
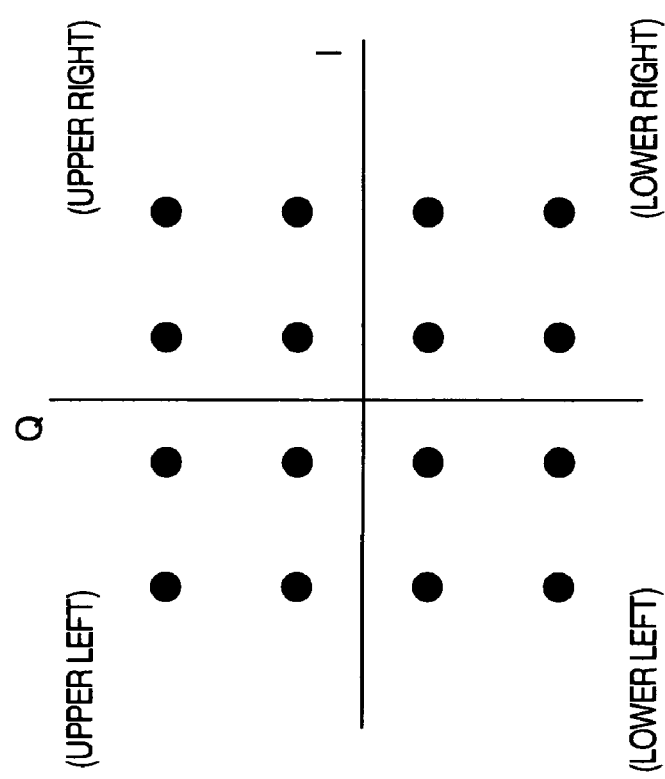
Figure 11B:
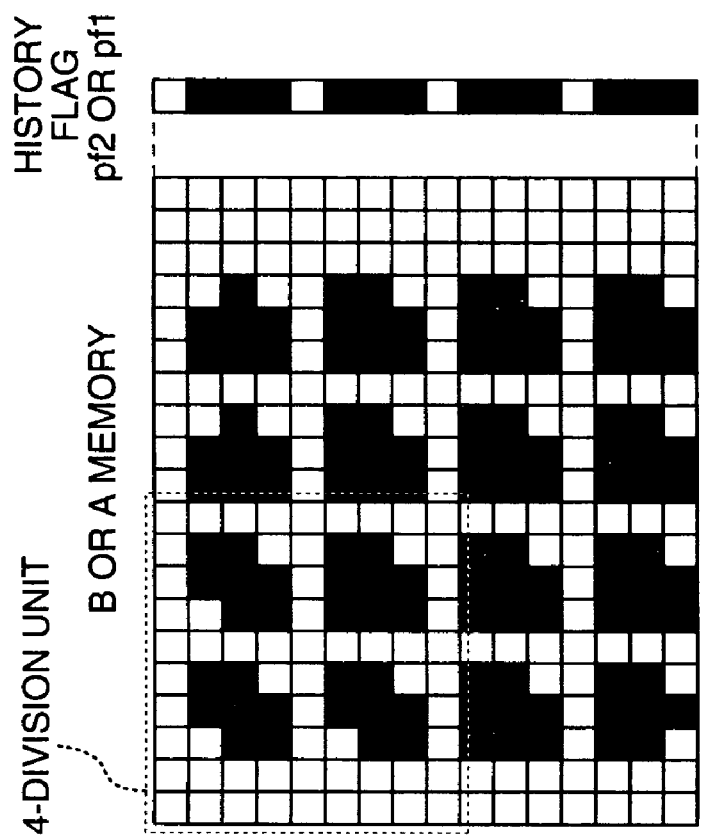
FIGS. 11A and 11B are diagrams for explaining a relationship between another example of the constellation display and the memory in the embodiment of the invention.
Figure 11A:
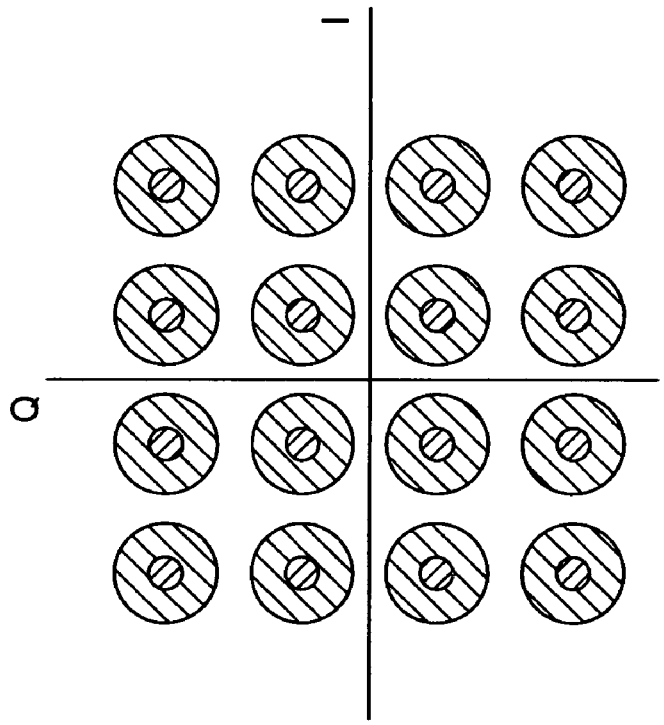
Figure 16A:
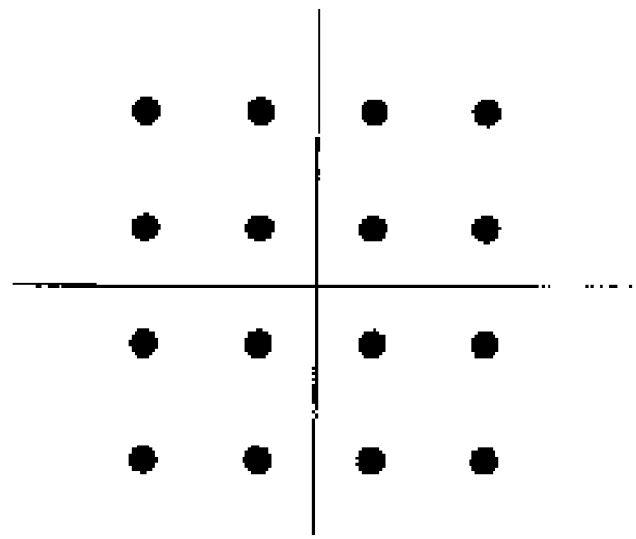
FIGS. 16A and 16B are diagrams showing examples of the constellation display.
Figure 16B:
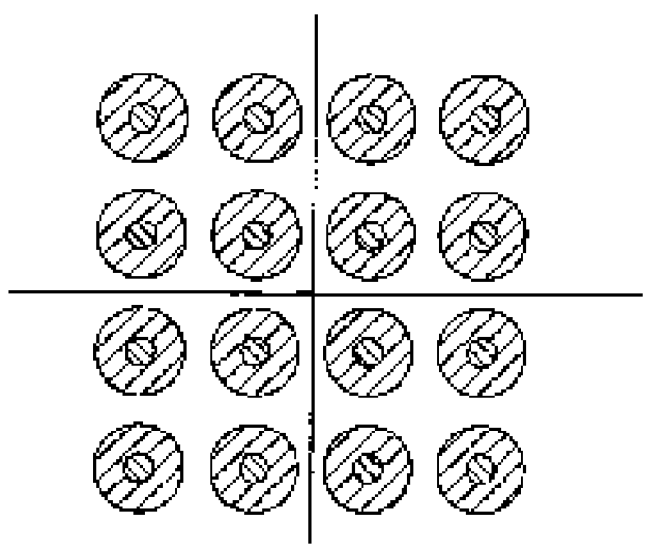

FIGS. 10A and 10B correspond to FIG. 16A, and FIGS. 11A and 11B correspond to FIG. 16B. In this connection, a history flag shown in the right end of the drawing will be explained later.

After this, the display data transmitter 20 executes operations (1) to (3) which follow at fixed intervals.

(1) The memory contents of addresses corresponding to the values of the I and Q components in the two-dimensional input data Dd are rewritten to 1. More specifically, data 1 is written to memory addresses corresponding to the level values of the I and Q signals.

(2) The memory contents are read out and transmitted as constellation array information.

(3) The all contents of the memories are initialized to data 0. More in detail, data 0 is written to all the addresses of the memories.

As a result, the display data receiver 21 can receive the constellation array information read out from the memories at fixed intervals.

Thus, each time the display data receiver 21 receives the constellation array information, the receiver executes operations (4) and (5) which follow.

(4) The contents of all the memories are initialized to data 0.

(5) According to the received constellation array information, the memory contents are updated.

(6) The memory contents are read out and visually displayed.

The then general operation is expressed by the timing chart of FIG. 6. As illustrated, the A memory 209 of the display data transmitter 20 repeats the erase, write and display operations during a time period of 3 frames from a frame N of a video signal to be displayed to a frame (N+2) thereof, and transmits the I and Q signals captured in the frame period (N+2) during a time of frames (N+3) to (N+5).

The A memory 216 of the display data receiver 21, according to the aforementioned explanation, performs erase operation during a time from the tail part of the frame (N+2) to the start part of the frame (N+3), captures data transmitted through a time duration of frames (N+3) to (N+5) during a time from the frame (N+3) to the frame (N+5), and displays the data during a time period from a frame (N+6) to a frame (N+8), though not shown.

In the embodiment explained above, the memories are provided in both of the display data transmitter 20 and display data receiver 21 to perform transfer of the constellation array information between the memories. Thus, the memory reading speed can be decreased, so that, even when the low speed line M such as a telephone line having a low data transmission rate is used, the constellation array information can be transmitted without any trouble.

By the way, in the case of line-of-sight propagation by microwave, its propagation environment varies from moment to moment, e.g., with change in the water level of a river located in the propagation path. In this case, it is necessary to save the propagation status for a fixed time duration and display it. However, it is difficult to attain it with use of a prior oscilloscope alone, and the prior art cannot cope with the write-over display for a long time.

In the case of a general oscilloscope, further, frequency response in its X axis is usually less than 1 MHz and thus the oscilloscope cannot follow a high-speed change in a signal point. For this reason, in the oscilloscope, a reduced number of signals must be usually prepared exclusively for observation.

However, the above embodiment is arranged to transfer data written in units of a frame between the memories. As a result, the propagation status can be saved in units of a frame duration, the constellation can be displayed on the oscilloscope as it is, whereby its arrangement can be simplified.

Explanation will then be made as to a second embodiment of the present invention. The present embodiment is arranged so that a memory is divided in units of a row, a history processor for storing presence or absence of a write in the row unit is provided in a display data transmitter, whereby transmission of the row unit without write is omitted and a transmission speed can be increased due to a reduced amount of transmission data.

Figure 12:
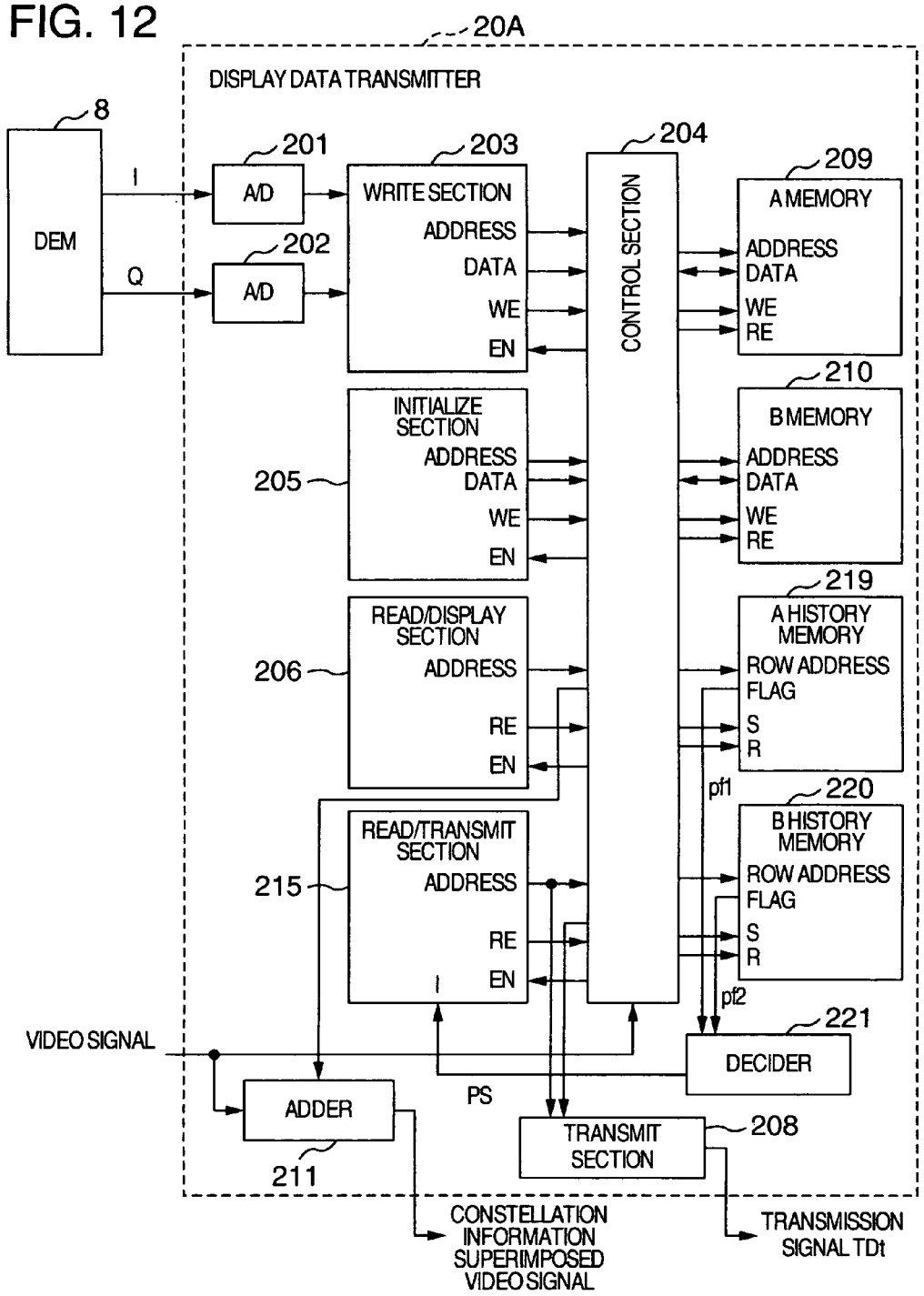
FIG. 12 is a block diagram of an arrangement of a second embodiment of the display data transmitter in the digital transmission system of the present invention.

FIG. 12 shows a display data transmitter 20A in the second embodiment, in which reference numerals 219 and 220 denote history memories, numeral 214 denotes a decider, and 215 denotes a read/transmit section. Other arrangement of the present embodiment is the same as in the display data transmitter 20 in the first embodiment.

Thus, the display data transmitter 20A corresponds to the display data transmitter 20, but is different therefrom in that the A history memory 219, the B history memory 220, and the decider 221 are added, and the read/transmit section 207 in the display data transmitter 20 of FIG. 2 is replaced by the read/display section 215.

The A history memory 219 is first connected to upper addresses of a row in the A memory 209, so that, if there is a data write of value 1, then a history flag pf1 is set, as shown in FIGS. 10A, 10B, 11A and 11B. And the A history memory 219 also has a function of clearing the history flag pf1 when the A memory 209 is initialized.

The B history memory 220 is connected to upper addresses of a row in the B memory 210, so that, if there is a data write of value 1, then a history flag pf2 is set, as shown in FIGS. 10A, 10B, 11A and 11B. The B history memory 220 also has a function of clearing the history flag pf2 when the B memory 210 is initialized.

Accordingly, with regard to the history flag pf1 or pf2, the flag of data 1 is set in ones of the rows of the A and B memories in which data are written, as shown in the right end of FIG. 11A.

The decider 221 receives the history flags pf1 and pf2 indicative of the write presence from the history memories 219 and 220. In the absence of the write, the decider 221 generates a signal PS indicative of no need of row-unit transmission.

Figure 13:
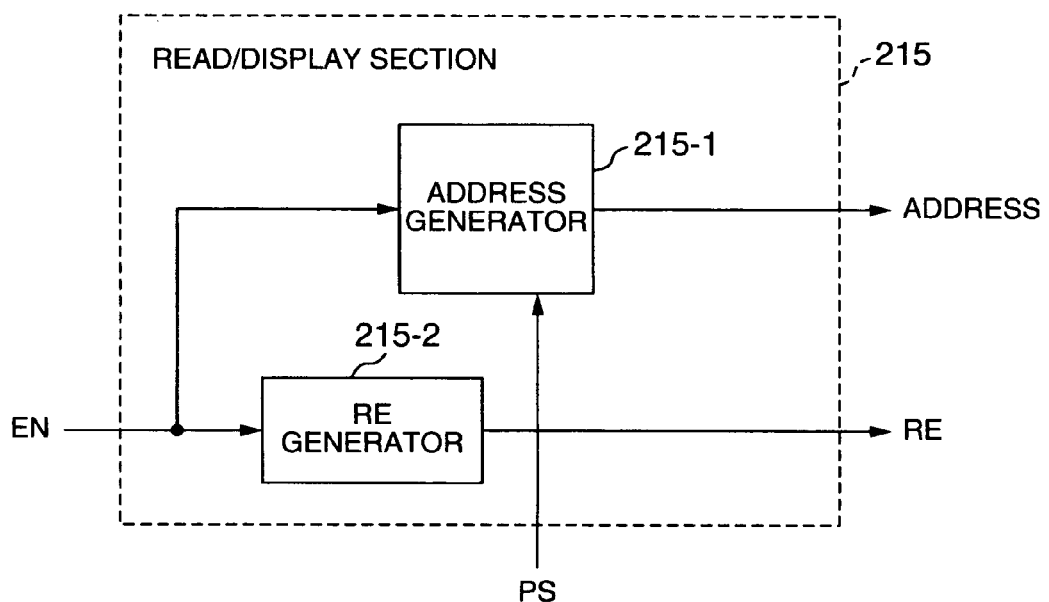
FIG. 13 is a block diagram showing details of a read/transmit section in the second embodiment of the display data transmitter of the display data transmitter in the invention.

As shown in FIG. 13, the read/display section 215 has an address generator 215-1 and an RE generator 215-2, and is basically the same as the read/display section 206 explained in FIG. 5. However, the read/display section 215 is different in that the signal PS is supplied to the address generator 215-1 so that, when receiving the signal PS, the address generator suppresses generation of addresses in the row and prevents reading of data about the row.

As a result, a row without any write in the same duration as a duration previous by one duration to the duration from the erase to the completion of the read & transmit shown in the transmission side of FIG. 6, that is, the row whose data was not updated is removed from the transmission. Thus in accordance with the present embodiment, the entire contents of each memory can be transmitted and displayed in a short time because the row whose data was not updated is omitted.

Explanation will next be made as to the operation of the display data transmitter 20A under control of the control section 204. Even in this case, the display data transmitter 20A is the same in basic operation as that under control of the control section 204 in the first embodiment explained in FIG. 2, but is different therefrom in that, when the read operation is completed by the read/display section 215, the operation is switched and executed between the A memory 209 and the B memory 210.

More specifically, the control section 204 performs the operation switching with use of 3 frames as shown by the timing chart of FIG. 6 in FIG. 2; whereas, the operation switching between the A and B memories 209 and 210 is carried out with use of, e.g., 2 frames in FIG. 13.

In this embodiment, the display data transmitter transmits only rows with write according to the history flags pf1 and pf2 by referring to the A and B history memories 219 and 220.

Figure 14:
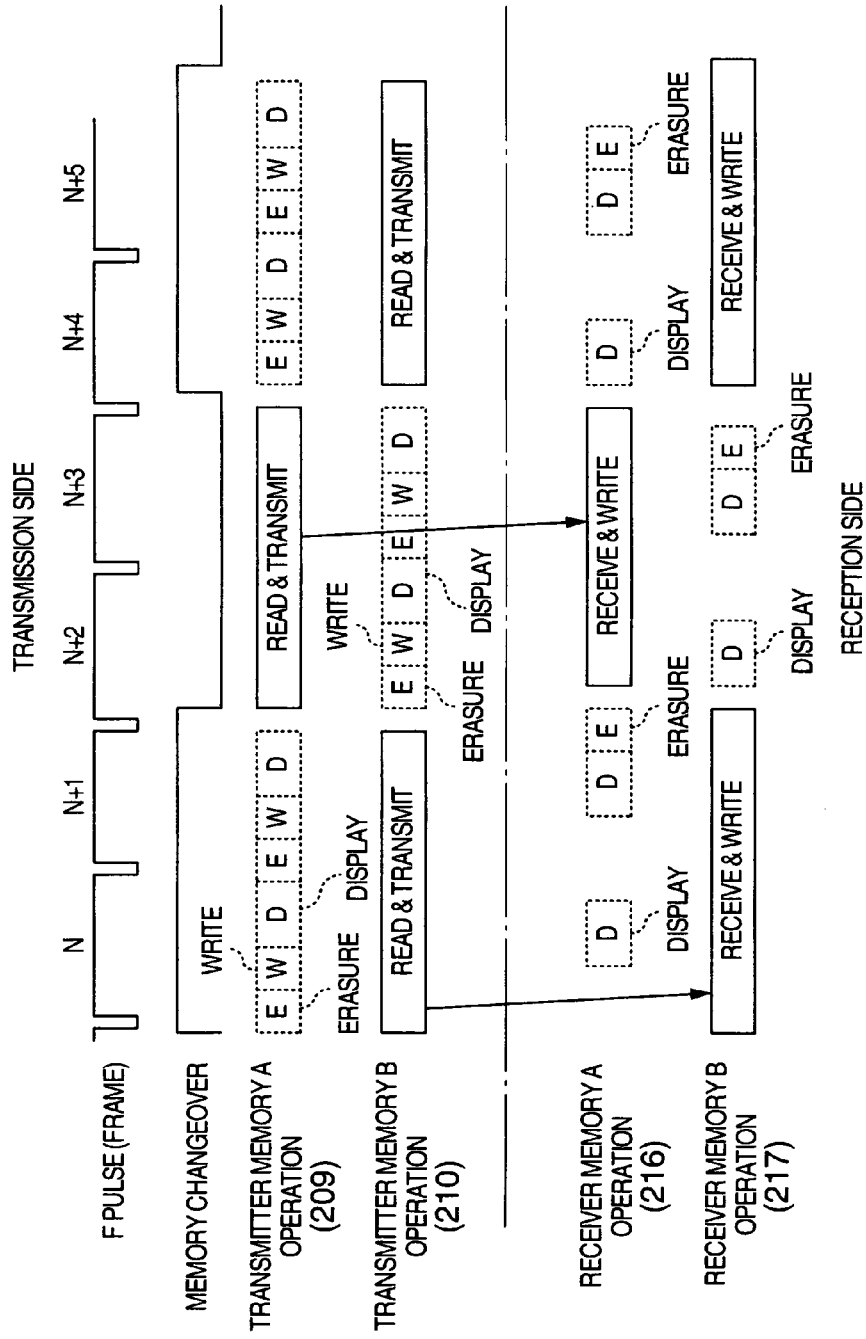
FIG. 14 shows a timing chart showing write, erase and read operations in transmission and reception sides in the second embodiment of FIG. 12.
Figure 15:
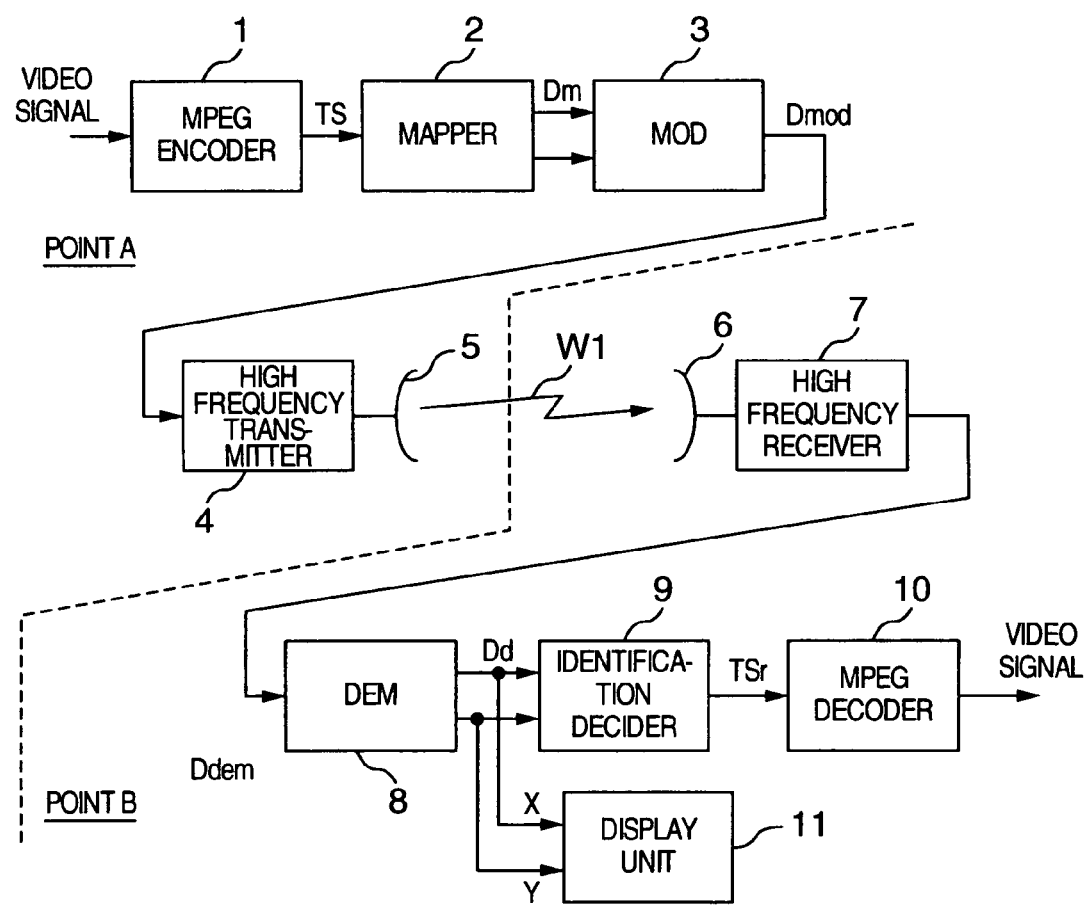
FIG. 15 is a system configuration of an example of prior art digital relay systems having a propagation status display function.

Accordingly, the operation of the A memory 209 of the display data transmitter 20A located in the transmission side as shown in FIG. 14 is as follows.

Head part of frame N→Erase entire A memory
Middle part of frame N→Write entire A memory
Tail part of frame N→Read (display) entire A memory
Head part of frame (N+1)→Erase entire A memory
Middle part of frame (N+1)→Write entire A memory
Tail part of frame (N+1)→Read (display) entire A memory
Frames (N+2) and (N+3)→Read & transmit divisions of A memory with write,
and so on.

Similarly, the operation of the B memory 210 in the transmission side is as follows.

Frames N and (N+1)→Erase entire B memory
Head part of frame (N+2)→Erase entire B memory
Middle part of frame (N+2)→Write entire B memory
Tail part of frame (N+2)→Read (display) entire B memory
Head part of frame (N+3)→Erase entire B memory
Middle part of frame (N+3)→Write entire B memory
Tail part of frame (N+3)→Read (display) entire B memory,
And so on.

The operation of the A memory 216 of the display data receiver 21 located in the reception side is as follows.

Middle part of frame N→Read (display) entire A memory
Middle part of frame (N+1)→Read (display) entire A memory
Tail part of frame (N+1)→Initialize entire A memory
Frames (N+2) and (N+3)→Receive & write divisions of A memory with read,
and so on.

The operation of the B memory 217 of the display data receiver 22 in the reception side is as follows.

Frames N and (N+1)→Receive & write divisions of B memory with write
Middle part of frame (N+2)→Read (display) entire B memory
Middle part of frame (N+3)→Read (display) entire B memory
Tail part of frame (N+3)→Initialize entire B memory,
and so on.

As mentioned above, in accordance with the second embodiment, data about rows, whose memory data are not updated, are removed from the transmission and thus the entire contents of each memory can be transmitted in a short time. As a result, even when such a low speed line M such as a telephone line is used, display can be updated with a good response and the user can more reliably recognize the propagation status.

The second embodiment is arranged so that, as shown in FIGS. 10A and 10B, decision on the presence or absence of the write in the A and B memories is carried out in units of a row, and the removal of the addresses of the row without write in the memories from the transmission is also carried out in units of a row.

However, the memory division in the present invention is not limited only to the row unit. For example, the memory may be divided in units of 4 divisions and be processed in units of such 4 divisions as shown in FIG. 11B.

In this case, each of the history flags pf1 and pf2 is arranged, for example, to have 4 flag fields as shown in the right end of FIG. 11B, and the 4 fields are associated with the presence or absence of the write in the 4 divisions respectively.

Explanation has been made in connection with only the display of the constellation based on the two-dimensional I and Q signals in the foregoing embodiments. However, the present invention is not limited to the constellation of the information to be written in the memories and transmitted, but may be applied even to, e.g., delay profile or spectrum condition.

Although the constellation data has been assumed to be transmitted via such a low speed line as a telephone line, the constellation may be carried on microwave together with the video signal and then transmitted as a matter of course.

Further, the relay site point is not limited to only one point, but the constellation data from the relay point can also be collected at a monitoring point different from the final reception point of the transmission video signal.

In accordance with the embodiments of the present invention, even when such a low speed transmission line as an existing telephone line is used, the transmission status based on the constellation or the like can be quickly transmitted and therefore the user can easily recognized the reception status of the relay point even at the final transmission point.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A digital transmission system for transmitting digital video signal of a type wherein a constellation information superimposed video signal of the transmitted digital video signal is mapped to two-dimensional data and transmitted from at least one relay point, said two-dimensional data being identified and reproduced into the constellation information superimposed video signal at a reception side, said system comprising:
a display data transmitter provided in said at least one relay point and having first and second memories for alternately writing and reading said two dimensional data to display a transmission status of said transmission signal, said display data transmitter reading out the said two dimensional data alternately from said first and second memories and transmitting said two dimensional data, alternately initializing said first and second memories after reading out;
a display data receiver provided in said reception side and having third and fourth memories for receiving said transmitted two dimensional data, writing, reading and outputting said two dimensional data, said display data receiver reading out the two dimensional data alternately from said third and fourth memories and outputting said two dimensional data, alternately initializing said first and second memories after reading out,
wherein the transmission status of said at least one relay point is displayed based on the said two dimensional data output from said display data receiver as the constellation information superimposed video signal; and
first and second history memories for storing write histories of write locations of said first and second memories respectively, and a decider for deciding only the write locations of said first and second memories on the basis of the write histories of the first and second write memories and outputting said two dimensional data for expressing transmission status display information about the write locations,
wherein said two dimensional data expressing transmission status display information is read out from each of said third and fourth memories in units of one of one-dimensional divisions of addresses of said each of said third and fourth memories.

2. A digital transmission system for transmitting digital video signal of a type wherein a constellation information superimposed video signal of the transmitted digital video signal is mapped to two-dimensional data and transmitted from at least one relay point, said two-dimensional data being identified and reproduced into the constellation information superimposed video signal at a reception side, said system comprising:
a display data transmitter provided in said at least one relay point and having first and second memories for alternately writing and reading said two dimensional data to display a transmission status of said transmission signal, said display data transmitter reading out the said two dimensional data alternately from said first and second memories and transmitting said two dimensional data, alternately initializing said first and second memories after reading out;
a display data receiver provided in said reception side and having third and fourth memories for receiving said transmitted two dimensional data, writing, reading and outputting the two dimensional data, said display data receiver reading out said two dimensional data alternately from said third and fourth memories and outputting said two dimensional data, alternately initializing said first and second memories after reading out,
wherein the transmission status of said relay point is displayed based on the said two dimensional data output from said display data receiver as constellation information superimposed video signal, and
first and second history memories for storing write histories of write locations of said first and second memories respectively, and a decider for deciding only the write locations of said first and second memories on the basis of the write histories of the first and second history memories and outputting said two dimensional data for expressing transmission status display information about the write locations,
wherein said transmission status display information is read out from each of said third and fourth memories in units of one of predetermined two-dimensional area divisions of addresses of said each of said third and fourth memories.

3. A digital transmission method for mapping constellation information superimposed video signal of the transmitted digital video signal to two-dimensional data, transmitting said two-dimensional data from at least one relay point, and at a reception side, identifying said two-dimensional data, and reproducing the data into the transmission signal, said method comprising the steps of:
writing said two dimensional data expressing transmission status display information alternately in first and second memories to display a transmission status of said transmission signal at said at least one relay point;
reading said transmission status display information alternately from said first and second memories and transmitting said transmission status display information to said reception side, alternately initializing said first and second memories after reading out;
receiving said transmitted transmission status display information at said reception side and written said transmission status display information alternately in third and fourth memories;
reading said transmission status display information alternately from said third and fourth memories and outputting said transmission status display information, alternately initializing said first and second memories after reading out;
storing write histories of write locations of said first and second memories respectively;
deciding only the write locations of said first and second memories on the basis of the write histories of said first and second memories; and
deciding and outputting the transmission status display information of the write locations, alternately initializing said first and second memories after reading out, wherein said transmission status display information is read out from each of said third and fourth memories in units of one of one-dimensional divisions of addresses of said each of said third and fourth memory.

4. A digital transmission method for mapping constellation information superimposed video signal of the transmitted digital video signal to two-dimensional data, transmitting said two-dimensional data from at least one relay point, and at a reception side, identifying said two-dimensional data, and reproducing the data into the transmission signal, said method comprising the steps of:
writing said two dimensional data expressing transmission status display information alternately in first and second memories to display a transmission status of said transmission signal at said at least one relay point;

reading said transmission status display information alternately from said first and second memories and transmitting transmission status display information to said reception side, alternately initializing said first and second memories after reading out;

receiving said transmitted transmission status display information at said reception side and writing transmission status display information alternately in third and fourth memories; and reading said transmission status display information alternately from said third and fourth memories and outputting said transmission status display information, alternately initializing said first and second memories after reading out, wherein said transmission status display information is read out from each of said third and fourth memories in units of one of predetermined two-dimensional area divisions of addresses of said each of said third and fourth memories.

5. A digital transmission system of a type wherein a digitally-modulated transmission signal is mapped to two-dimensional data and transmitted from at least one relay point, said two-dimensional data being identified and reproduced into the transmission signal at a reception side, said system comprising:

a display data transmitter provided in said at least one relay point and having first and second memories for alternately written and reading transmission status display information to display a transmission status of said transmission signal, said display data transmitter reading out the transmission status display information alternately from said first and second memories and transmitting the transmission status display information;

a display data receiver provided in said reception side and having third and fourth memories for receiving said transmitted transmission status display information, writing, reading and outputting the transmission status display information, said display data receiver reading out the transmission status display information alternately from said third and fourth memories and outputting the transmission status display information, wherein the transmission status of said relay point can be displayed on the basis of the transmission signal display information output from said display data receiver; and first and second history memories for storing write histories of write locations of said first and second memories respectively, and a decider for deciding only the write locations of said first and second memories on the basis of the write histories of the first and second memories and outputting transmission status display information about the write locations, and wherein said transmission status display information is read out from each of said third and fourth memories in units of one of one-dimensional divisions of addresses of said each of said third and fourth memories.

6. A digital transmission system of a type wherein a digitally-modulated transmission signal is mapped to two-dimensional data and transmitted from at least one relay point, said two-dimensional data being identified and reproduced into the transmission signal at a reception side, said system comprising:

a display data transmitter provided in said at least one relay point and having first and second memories for alternately written and reading transmission status display information to display a transmission status of said transmission signal, said display data transmitter reading out the transmission status display information alternately from said first and second memories and transmitting the transmission status display information;

a display data receiver provided in said reception side and having third and fourth memories for receiving said transmitted transmission signal display information, writing, reading and outputting the transmission status display information, said display data receiver reading out the transmission status display information alternately from said third and fourth memories and outputting the transmission status display information, wherein the transmission status of said relay point can be displayed on the basis of the transmission status display information output from said display data receiver; and first and second history memories for storing write histories of write locations of said first and second memories respectively, and a decider for deciding only the write locations of said first and second memories on the basis of the write histories of the first and second history memories and outputting transmission status display information about the write locations, wherein said transmission signal display information is read out from each of said third and fourth memories in units of one of predetermined two-dimensional area divisions of addresses of said each of said third and fourth memories.

7. A digital transmission method for mapping a digitally-modulated transmission signal to two-dimensional data, transmitting said two-dimensional data from at least one relay point, and at a reception side, identifying said two-dimensional data, and reproducing the data into the transmission signal, said method comprising the steps of:

writing transmission signal display information alternately in first and second memories to display a transmission status of said transmission signal at said at least one relay point;

reading said transmission signal display information alternately from said first and second memories and transmitting the transmission signal display information to said reception side;

receiving said transmitted transmission signal display information at said reception side and writing the transmission signal display information alternately in third and fourth memories;

reading said transmission signal display information alternately from said third and fourth memories and outputting the transmission signal display information;

storing write histories of write locations of said first and second memories respectively;

deciding only the write locations of said first and second memories on the basis of the write histories of said first and second memories; and deciding and outputting the transmission signal display information of the write locations, wherein said transmission signal display information is read out from each of said memories in units of one of one-dimensional divisions of addresses of said each memory.

8. A digital transmission method for mapping a digitally-modulated transmission signal to two-dimensional data, transmitting said two-dimensional data from at least one relay point, and at a reception side, identifying said two-dimensional data, and reproducing the data into the transmission signal, said method comprising the steps of:

writing transmission signal display information alternately in first and second memories to display a transmission status of said transmission signal at said at least one relay point;

reading said transmission signal display information alternately from said first and second memories and transmitting the transmission signal display information to said reception side;

receiving said transmitted transmission signal display information at said reception side and writing the transmission signal display information alternately in third and fourth memories;

reading said transmission signal display information alternately from said third and fourth memories and outputting the transmission signal display information;

storing write histories of write locations of said first and second memories respectively;

deciding only the write locations of said first and second memories on the basis of the write histories of said first and second memories; and deciding and outputting the transmission signal display information of the write locations, wherein said transmission signal display information is read out from each of said third and fourth memories in units of one of predetermined two-dimensional area divisions of addresses of said each of said third and fourth memories.

* * * * *